United States Patent
Sato

(10) Patent No.: US 10,350,943 B2
(45) Date of Patent: Jul. 16, 2019

(54) THERMOPLASTIC ELASTOMER COMPOSITION

(71) Applicant: The Yokohama Rubber Co., Ltd., Minato-ku (JP)

(72) Inventor: Shun Sato, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 178 days.

(21) Appl. No.: 15/129,165

(22) PCT Filed: Mar. 26, 2015

(86) PCT No.: PCT/JP2015/059334
§ 371 (c)(1),
(2) Date: Sep. 26, 2016

(87) PCT Pub. No.: WO2015/147148
PCT Pub. Date: Oct. 1, 2015

(65) Prior Publication Data
US 2018/0170104 A1  Jun. 21, 2018

(30) Foreign Application Priority Data
Mar. 26, 2014 (JP) .................. 2014-063714

(51) Int. Cl.
| | |
|---|---|
| *B60C 1/00* | (2006.01) |
| *B60C 5/14* | (2006.01) |
| *C08L 23/28* | (2006.01) |
| *C08L 29/04* | (2006.01) |
| *C08L 25/16* | (2006.01) |
| *C08L 77/02* | (2006.01) |
| *C08L 77/06* | (2006.01) |

(52) U.S. Cl.
CPC .............. *B60C 1/0008* (2013.01); *B60C 5/14* (2013.01); *C08L 23/283* (2013.01); *C08L 25/16* (2013.01); *C08L 29/04* (2013.01); *C08L 77/02* (2013.01); *C08L 77/06* (2013.01)

(58) Field of Classification Search
CPC .......... H05H 1/34; B60C 1/0008; B60C 1/00; B60C 5/14; C08L 23/28; C08L 29/04; C08L 25/16
USPC ....................................................... 524/515
See application file for complete search history.

(56) References Cited

U.S. PATENT DOCUMENTS

| | | | |
|---|---|---|---|
| 2003/0022993 A1 | 1/2003 | Arakawa et al. | |
| 2013/0025757 A1 | 1/2013 | Tomoi et al. | |
| 2013/0156982 A1 | 1/2013 | Kawaguchi et al. | |
| 2015/0057414 A1* | 2/2015 | Tomoi .................. | B60C 1/0008 525/183 |

FOREIGN PATENT DOCUMENTS

| | | |
|---|---|---|
| CN | 104169369 A | 11/2014 |
| EP | 2 184 323 A1 | 5/2010 |
| JP | 2003089702 A | 3/2003 |
| JP | 2011231166 * | 11/2011 |
| JP | 2011231166 A | 11/2011 |
| JP | 2012046614 A | 3/2012 |
| JP | 2012076679 A | 4/2012 |
| JP | 2013189526 A | 9/2013 |
| WO | WO-2012/035828 A1 | 3/2012 |
| WO | WO 2013/136596 * | 9/2013 |
| WO | WO-2013/136596 A1 | 9/2013 |

* cited by examiner

*Primary Examiner* — Deve E Valdez
(74) *Attorney, Agent, or Firm* — Polsinelli PC

(57) ABSTRACT

A thermoplastic elastomer composition including (a) a halogenated isoolefin para-alkylstyrene copolymer, (b) a modified rubber having an acid anhydride group, (c) a polymer component including an ethylene-vinyl alcohol copolymer, (d) a processing aid comprising an alkaline earth metal salt of a higher fatty acid, and (e) a crosslinking agent, wherein the weight ratio ($W_a$) of the halogenated isoolefin para-alkylstyrene copolymer (a) in the elastomer components ((a)+(b)) is 5-60 wt %, the weight ratio ($W_b$) of the modified rubber (b) having an acid anhydride group in the elastomer components ((a)+(b)) is 95-40 wt %, and the content ($W_d$) of the processing aid (d) is 0.3-30 parts by mass with respect to 100 parts by mass of the halogenated isoolefin para-alkylstyrene copolymer (a).

20 Claims, No Drawings

THERMOPLASTIC ELASTOMER COMPOSITION

CROSS REFERENCE TO RELATED APPLICATIONS

This application is a National Phase filing under 35 U.S.C. § 371 of PCT/JP2015/059334 filed on Mar. 26, 2015; and this application claims priority to Application No. 2014-063714 filed in Japan on Mar. 26, 2014, under 35 U.S.C. § 119. The entire contents of each application are hereby incorporated by reference.

TECHNICAL FIELD

The present invention relates to a thermoplastic elastomer composition, and a film composed of the composition and a tire using the film.

BACKGROUND ART

A thermoplastic elastomer composition is known which includes ethylene-vinyl alcohol copolymer and a polyamide resin as a thermoplastic resin component, and an anhydrous maleic acid modified ethylene-propylene copolymer, as an elastomer component, which is a modified rubber having an acid anhydride group, and also includes an alkaline earth metal salt of higher fatty acid (Patent document 1).

Another thermoplastic elastomer composition is also known which includes an ethylene-vinyl alcohol copolymer and a polyamide resin as thermoplastic resin components, and a halogenated isoolefin-para-alkylstyrene copolymer as an elastomer component, which elastomer component is crosslinked (Patent document 2).

Still another thermoplastic elastomer composition is known which includes a resin such as a polyamide resin as a thermoplastic resin component, a crosslinked halogenated isoolefin-para-alkylstyrene copolymer as a elastomer component, and a modified rubber having an acid anhydride group, such as anhydrous maleic acid modified ethylene-propylene copolymer and anhydrous maleic acid modified ethylene-butene copolymer (Patent document 3).

CITATIONS LIST

Patent Literatures

Patent document 1: Japanese Unexamined Patent Publication (Kokai) No. 2011-231166
Patent document 2: Japanese Unexamined Patent Publication (Kokai) No. 2012-46614
Patent document 3: Japanese Unexamined Patent Publication (Kokai) No. 2013-189526

SUMMARY OF INVENTION

Technical Problem

In order to obtain a thermoplastic elastomer composition excellent in air-proof property and durability at low temperature, ethylene-vinyl alcohol copolymer can be used as a thermoplastic resin, and a modified rubber having an acid anhydride group can be used as an elastomer component. In this case, when a large amount of the modified rubber having an acid anhydride group is blended to the composition in order to improve durability at low temperature, the viscosity of the thermoplastic elastomer composition increases, leading to the worsening of film formability.

Accordingly, a subject of the present invention is to provide a thermoplastic elastomer composition excellent in durability at low temperature without worsening the film formability even when the modified rubber having an acid anhydride group is heavily loaded.

Solution to Problem

The present inventors have found, after an extensive study in view of the above-mentioned subject, that a thermoplastic elastomer composition having excellent film formability and durability at low temperature can be obtained by blending, to a thermoplastic elastomer composition comprising an ethylene-vinyl alcohol copolymer and a modified rubber having an acid anhydride group, a halogenated isoolefin-para-alkylstyrene copolymer as an additional elastomer component, and a processing aid composed of an alkaline earth metal salt of higher fatty acid, and thus the present invention has been achieved.

The present invention has following aspects.

[1] A thermoplastic elastomer composition comprising
a polymer component including
(a) a halogenated isoolefin-para-alkylstyrene copolymer;
(b) a modified rubber having an acid anhydride group; and
(c) an ethylene-vinyl alcohol copolymer,
and
(d) a processing aid composed of an alkaline earth metal salt of higher fatty acid; and
(e) a crosslinker,
wherein a weight ratio ($W_a$) of the halogenated isoolefin-para-alkylstyrene copolymer (a) to the elastomer component ((a)+(b)) is 5 to 60 wt %,
wherein a weight ratio ($W_b$) of the modified rubber (b) having an acid anhydride group to the elastomer component ((a)+(b)) is 95 to 40 wt %,
wherein a content ($W_d$) of the processing aid (d) composed of an alkaline earth metal salt of higher fatty acid is 0.3 to 30 parts by mass with respect to 100 parts by mass of the halogenated isoolefin-para-alkylstyrene copolymer (a).

[2] The thermoplastic elastomer composition according to [1], further comprising (f) a polyamide resin as a polymer component, wherein a weight ratio of the polyamide resin (f) to the thermoplastic resin component ((c)+(f)) is 5 to 50 wt %.

[3] The thermoplastic elastomer composition according to [1] or [2], wherein a weight ratio of the elastomer component ((a)+(b)) to the polymer component is 40 wt % or more.

[4] The thermoplastic elastomer composition according to any one of [1] to [3], wherein the processing aid (d) is an alkaline earth metal salt of a C5-30 fatty acid.

[5] The thermoplastic elastomer composition according to any one of [1] to [4], wherein a saponification degree of the ethylene-vinyl alcohol copolymer (c) is 90% or more.

[6] A film composed of the thermoplastic elastomer composition according to any one of [1] to [5].

[7] A tire using the film according to [6].

Advantageous Effects of Invention

The thermoplastic elastomer composition of the present invention has an excellent film formability and durability at low temperature.

DESCRIPTION OF EMBODIMENTS

In the present specification, "thermoplastic elastomer composition" means a composition comprising an elastomer component dispersed into a thermoplastic resin component, and the thermoplastic resin component constitutes a matrix phase and the elastomer component constitutes a dispersed phase.

The thermoplastic elastomer composition of the present invention comprises a polymer component comprising (a) a halogenated isoolefin-para-alkylstyrene copolymer, (b) a modified rubber having an acid anhydride group, and (c) an ethylene-vinyl alcohol copolymer; and (d) a processing aid composed of an alkaline earth metal salt of higher fatty acid; and (e) a crosslinker.

The halogenated isoolefin-para-alkylstyrene copolymer (a) used in the present invention can be obtained by halogenating a copolymer of, for example, isoolefin and para-alkylstyrene. The mixing ratio of the isoolefin to the para-alkylstyrene, degree of polymerization, average molecular weight, form of polymerization (such as a block copolymer, a random copolymer), viscosity, and halogen atom, and so on, of the halogenated isoolefin-para-alkylstyrene copolymer are not particularly limited, and can be selected depending on physical properties among other things required for the thermoplastic elastomer composition by those skilled in the art. Examples of the isoolefin constituting the halogenated isoolefin-para-alkylstyrene copolymer include isobutylene, isopentene, and isohexene, and the isoolefin is preferably isobutylene. Examples of the para-alkylstyrene constituting the halogenated isoolefin-para-alkylstyrene copolymer include para-methylstyrene, paraethylstyrene, parapropylstyrene, and parabutylstyrene, and the para-alkylstyrene is preferably paramethylstyrene. Examples of the halogen atom constituting the halogenated isoolefin-para-alkylstyrene copolymer include fluorine, chlorine, bromine, and iodine, and the halogen atom is preferably bromine. A particularly preferable halogenated isoolefin-para-alkylstyrene copolymer is brominated isobutylene-paramethylstyrene copolymer. The brominated isobutylene-paramethylstyrene copolymer rubber can be a commercially available product, and can be obtained, for example, under a trade name of Exxpro (trademark) from ExxonMobil Chemical Company.

In the present specification, "modified rubber having an acid anhydride group" means an elastomer having an acid anhydride group introduced therein. The modified rubber having an acid anhydride group can be produced, for example, by reacting an acid anhydride and a peroxide with an elastomer. The amount of the acid anhydride group in the modified rubber (b) having an acid anhydride group used in the present invention is preferably 0.01 to 1 mole/kg and more preferably 0.05 to 0.5 mole/kg, from the viewpoint of the dispersivity and processability of the modified rubber having an acid anhydride group. Examples of the modified rubber having an acid anhydride group include an acid anhydride-modified product of an ethylene α-olefin copolymer (for example, an acid anhydride-modified product of ethylene-propylene copolymer, an acid anhydride-modified product of ethylene-butene copolymer), and acid anhydride product of ethylene-unsaturated carboxylic acid copolymer (for example, an acid anhydride-modified product of ethylene-acrylic acid copolymer, an acid anhydride-modified product of ethylene-methacrylic acid copolymer, an acid anhydride-modified product of ethylene-methyl acrylate copolymer, an acid anhydride-modified product of ethylene-methyl methacrylate copolymer), and so on. Among these products, an acid anhydride-modified product of an ethylene-α-olefin copolymer is preferable, and anhydrous maleic acid-modified ethylene-propylene copolymer and anhydrous maleic acid-modified ethylene-butene copolymer are more preferable. Furthermore, the modified rubber having an acid anhydride group can be a commercially available product, which is, for example, anhydrous maleic acid-modified ethylene-propylene copolymer (TAFMER (trademark) MP0620), anhydrous maleic acid-modified ethylene-butene copolymer (TAFMER (trademark) MH7020) from Mitsui Chemicals, Inc.

The ethylene-vinyl alcohol copolymer (hereinafter, also referred to as "EVOH") (c) used in the present invention is a copolymer composed of an ethylene unit (—CH$_2$CH$_2$—) and a vinyl alcohol unit (—CH$_2$—CH(OH)—), but it may contain other constituent units in addition to the ethylene unit and the vinyl alcohol unit so far as they do not inhibit effects of the present invention.

The ethylene-vinyl alcohol copolymer (c) used in the present invention is not particularly limited, but from the viewpoint of barrier property against gas, the polymer having the content of the ethylene unit preferably of 20 to 60 mole % and more preferably of 20 to 50 mole % is used. The ethylene-vinyl alcohol copolymer is a saponificated product of ethylene-vinyl acetate copolymer, the saponification degree of which is not particularly limited, but is preferably 90% or more and more preferably 99% or more, from the viewpoint of barrier property against gas.

The ethylene-vinyl alcohol copolymer (c) used in the present invention exhibits a Melt Flow Rate (MFR) value preferably of 2 to 25 g/10 minutes and more preferably of 4 to 20 g/10 minutes when measured in accordance to JIS K7210 at a temperature of 210° C. with a load of 2160 g.

In the thermoplastic elastomer composition of the present invention, a weight ratio ($W_a$) of the halogenated isoolefin-para-alkylstyrene copolymer (a) to the elastomer component (i.e., total amount of the halogenated isoolefin-para-alkylstyrene copolymer (a) and the modified rubber (b) having an acid anhydride group: (a)+(b)) is 5 to 60 wt %, and is preferably 10 to 45 wt %. When the weight ratio ($W_a$) is less than 5 wt %, good kneading processability cannot be obtained in producing the thermoplastic elastomer composition. Further, when the weight ratio ($W_a$) is more than 60 wt %, durability at low temperature of the thermoplastic elastomer composition worsens.

In the thermoplastic elastomer composition of the present invention, a weight ratio ($W_b$) of the modified rubber (b) having an acid anhydride group to the elastomer component ((a)+(b)) is 95 to 40 wt %, and is preferably 90 to 55 wt %. When the weight ratio ($W_b$) is less than 40 wt %, the durability at low temperature of the thermoplastic elastomer composition worsens. Further, the weight ratio ($W_b$) is more than 95 wt %, good kneading processability cannot be obtained.

The processing aid (d) used in the present invention consists of an alkaline earth metal salt of higher fatty acid. The processing aid not only can function as a lubricant for continuous kneadability during melt kneading the thermoplastic resin component and the elastomer component and for alleviating extrusion load upon film formation, but also can retard the crosslinking reaction of the halogenated isoolefin-para-alkylstyrene copolymer (a). This inhibits increase in viscosity owing to the crosslinking at an initial stage of kneading in producing the thermoplastic elastomer composition, and the kneading processability can be improved.

The processing aid (d) is preferably an alkaline earth metal salt of a C5-30 fatty acid, and is more preferably at least one selected from barium laurate, magnesium stearate, and calcium stearate.

A content ($W_d$) of the processing aid (d) in the thermoplastic elastomer composition of the present invention is 0.3 to 30 parts by mass and preferably 1 to 20 parts by mass, with respect to 100 parts by mass of the halogenated isoolefin-para-alkylstyrene copolymer (a). When the $W_d$ is less than 0.3 parts by mass, good kneading processability cannot be obtained in producing the thermoplastic elastomer composition. When the $W_d$ is more than 30 parts by mass, the durability at low temperature of the plastic elastomer composition worsens.

The thermoplastic elastomer composition of the present invention may further comprise a polyamide resin (f), as a polymer component, which is a thermoplastic resin component. Examples of the polyamide resin may include, but are not limited to, nylon 11, nylon 12, nylon 6, nylon 66, nylon 666, nylon 612, nylon 610, nylon 46, nylon 66612 and an aromatic nylon, which can be used singly or as a mixture. Among them, nylon 6, nylon 66, nylon 612, and nylon 666 are preferable in terms of fatigue resistance and barrier property against gas.

When the thermoplastic elastomer composition of the present invention further comprises the polyamide resin as a polymer component, a weight ratio of the polyamide resin (f) to the thermoplastic resin component (i.e. total amount of the ethylene-vinyl alcohol copolymer (c) and the polyamide resin (f): (c)+(f)) is preferably 5 to 50 wt % and more preferably 10 to 45 wt %, from the viewpoint of fatigue resistance and barrier property against gas.

In addition, the thermoplastic elastomer composition of the present invention preferably comprises the heavily-loaded elastomer component, from the viewpoint of improving durability at low temperature. Specifically, the weight ratio of the elastomer component ((a)+(b)) to the polymer component is 40 wt % or more and more preferably 50 wt % or more.

The kind and blending amount of the crosslinker (vulcanizer) (e) used in the present invention can be appropriately selected by those skilled in the art, depending on crosslinking conditions. In the present invention, at least the halogenated isoolefin-para-alkylstyrene copolymer (a) is crosslinked, but the modified rubber (b) having an acid anhydride group may not be necessarily crosslinked. Examples of the crosslinker include zinc oxide, magnesium oxide, m-phenylene bismaleimide, an alkyl phenol resin and an halide thereof, a secondary amine such as N-(1,3-dimethylbutyl)-N'-phenyl-p-phenylene diamine (the common name of which is 6PPD), tris-(2-hydroxyethyl)isocyanurate, and so on. Among them, at least one crosslinker selected from zinc oxide, 6PPD, and tris-(2-hydroxyethyl)isosyanurate is preferable. In this case, zinc oxide and 6PPD are used as crosslinkers for crosslinking the halogenated isoolefin-para-alkylstyrene copolymer (a). Tris-(2-hydroxyethyl)isocyanurate is used as a crosslinker for the modified rubber (b) having an acid anhydride group. The amount of the crosslinker (e) is preferably 0.5 to 10 parts by mass and more preferably 1 to 6 parts by mass, with respect to 100 parts by mass of the elastomer component ((a)+(b)).

In the thermoplastic elastomer composition of the present invention, when the polymer component, the processing aid, and the crosslinker are blended, various additives generally blended for thermoplastic resin compositions and elastomer compositions, such as a filling agent, a reinforcing agent (filler), a crosslinking accelerator (vulcanization accelerator), a compatibilizer, a stable agent, an antioxidant, and an aging inhibitor can be added, if necessary, in an amount which does not inhibit effects of the present invention, in order to improve a property such as reinforcement property, processability, dispersivity, thermal resistance, antioxidation property, and so on. Alternatively, before the polymer component, the processing aid, and the crosslinker are blended to produce the thermoplastic elastomer composition of the present invention, various additives generally blended for thermoplastic resin compositions and elastomer compositions, such as filling agents, reinforcing agents (fillers), crosslinking accelerators (vulcanization accelerators), compatibilizers, stable agents, antioxidants, and aging inhibitors can be added, in advance, to one or two or more species in the polymer component, if necessary, in an amount which does not inhibit effects of the present invention, in order to improve a property such as reinforcement property, processability, dispersivity, thermal resistance, antioxidation property, and so on.

The thermoplastic elastomer composition of the present invention can be produced by melt kneading of the above-mentioned essential ingredients and optional additives by using a kneading extruder generally used for production of thermoplastic elastomer compositions, such as a kneader, a Bambari mixer, a single-screw kneading extruder, and a twin-screw kneading extruder. Melt kneading enables dynamic crosslinking of the elastomer component. Dynamical crosslinking enables stabilization (or fixation) of the dispersed phase into the continuous phase in the thermoplastic elastomer composition. Melt kneading is preferably carried out by using a twin-screw kneading extruder in terms of its productivity. Kneading conditions depend on, for example, the type and blending amount of the essential ingredients and the optional additives to be used, but the lower limit of melt kneading temperature only has to be at least higher than or equal to the melting temperature of the thermoplastic resin component, and it is preferably higher than the melting temperature by about 20° C. or more. For example, it is 190-240° C. Melt kneading duration is preferably with in the range from about 2 to about 8 minutes.

Then, the thermoplastic elastomer composition melt-kneaded as described above can be extruded, in the molten state, into a film-like or tubular shape via a die attached to an ejection opening of the kneading extruder, or can be extruded into a strand-like shape, to be pelletized temporally by a pelletizer for resin, and then to be formed into a desired shape, such as film-like, sheet-like, or tubular shape depending on use applications, by a usual method for molding resin, such as inflation molding method, calender molding method, extrusion molding method, and so on.

A production method of a product having a layer formed from the thermoplastic elastomer composition of the present invention can be exemplified by a production method of a pneumatic tire as one example. Conventional methods can be used as the production method of a pneumatic tire having a layer formed from the thermoplastic elastomer composition of the present invention. For example, the thermoplastic elastomer composition of the present invention is formed into a film having a given width and thickness, which is then applied cylindrically to a tire-forming drum, and a tire member, such as a carcass layer, a belt layer, and a tread layer is sequentially layered thereon, and the green tire is detached from the tire-forming drum. Then, by vulcanizing this green tire according to a usual method, a pneumatic tire can be produced which has a film formed from the thermoplastic elastomer composition of the present invention as a layer for preventing air-permeation (for example, as an inner liner).

EXAMPLES

The present invention will be more specifically explained with reference to Examples and Comparative examples described hereinafter, but it goes without saying that the scope of the present invention is not limited by the Examples.

(1) Materials

Brominated isobutylene-paramethylstyrene copolymer (hereinafter abbreviated as "Br-IPMS") Exxpro MDX89-4 (Exxon Mobil Chemica)

Modified rubber having an acid anhydride group 1: anhydrous maleic acid modified ethylene-butene copolymer (TAFMER MH7020 (Mitsui Chemicals, Inc.))

Modified rubber having an acid anhydride group 2: anhydrous maleic acid modified ethylene-butene copolymer (TAFMER MH7010 (Mitsui Chemicals, Inc.))

Modified rubber having an acid anhydride group 3: anhydrous maleic acid modified ethylene-propylene copolymer (TAFMER MP0620 (Mitsui Chemicals, Inc.))

EVOH 1: Soarnol V2504 (Nippon Synthetic Chemical Industry Co., Ltd.) (MFR, 4.0 g/10 minutes; content of ethylene unit, 25 mol %)

EVOH 2: Soarnol D2908 (Nippon Synthetic Chemical Industry Co., Ltd.) (MFR, 8.0 g/10 minutes; content of ethylene unit, 29 mol %)

EVOH 3: Soarnol DC3212B (Nippon Synthetic Chemical Industry Co., Ltd.) (MFR, 12.0 g/10 minutes; content of ethylene unit, 32 mol %)

EVOH 4: Soarnol E 3808 (Nippon Synthetic Chemical Industry Co., Ltd.) (MFR, 8.0 g/10 minutes; content of ethylene unit, 38 mol %)

EVOH 5: Soarnol A4412 (Nippon Synthetic Chemical Industry Co., Ltd.) (MFR, 12.0 g/10 minutes; content of ethylene unit, 44 mol %)

EVOH 6: Soarnol H4815B (Nippon Synthetic Chemical Industry Co., Ltd.) (MFR, 15.0 g/10 minutes; content of ethylene unit, 48 mol %)

Processing aid 1: zinc stearate SZ-2000 (Sakai Chemical industry Co., Ltd.)

Processing aid 2: calcium stearate SC-100 (Sakai Chemical industry Co., Ltd.)

Processing aid 3: magnesium stearate SM-PG (Sakai Chemical industry Co., Ltd.)

Processing aid 4: barium laurate B12 (Sakai Chemical industry Co., Ltd.)

Polyamide resin 1: nylon 6-12: UBE nylon 7024B (Ube Industries, Ltd.)

Polyamide resin 2: nylon 6 (UBE nylon 1013B (Ube Industries, Ltd.))

Polyamide resin 3: nylon 6-10 (Amilan CM 6001 (Toray Industries, Inc.))

Crosslinker 1: zinc oxide of grade 3 (SEIDO CHEMICAL INDUSTRY CO., LTD.)

Crosslinker 2: 6PPD (Santoflex; Flexsys)

Crosslinker 3: tris-(2-hydroxyethyl)isocyanurate (THEICA; SHIKOKU CHEMICALS CORPORATION)

The crosslinkers 1 and 2 were used for crosslinking Br-IPMS. The crosslinker 3 was used for crosslinking the modified rubbers having an acid anhydride group. The crosslinker 2 was also used as an aging inhibitor.

(2) Preparation of Thermoplastic Elastomer Composition

Brominated isobutylene-para-methylstyrene copolymerized rubber (a), a modified rubber (b) having an acid anhydride group, EVOH (c), a processing aid (d), a crosslinker (e), a polyamide resin (f), and other components were introduced, in blending amounts shown in Tables 1 and 2, into a cylinder of a twin-screw kneading extruder (from The Japan Steel Works, LTD.), and then conveyed to be melt-kneaded in the kneading zone thereof, the temperature and the residence time of which were set to be 230° C. and about 2 to 8 minutes, respectively, followed by extruding a resultant melt-kneaded product into a strand-like shape, from a die attached to the ejection opening thereof. The resultant strand-like extruded product was pelletized by a pelletizer for resin to yield a pellet-like thermoplastic elastomer composition.

(3) Evaluation Method of Plasticity Resin Composition

The resultant thermoplastic elastomer composition was evaluated for twin-screw kneadability and durability at low temperature by using the following methods.

[Twin-Screw Kneadability]

A condition of the strand extruded from the die was evaluated during the preparation of the above-described thermoplastic elastomer composition. A strand which was able to be sampled continuously for one hour without any cutoff was determined to be "excellent", a strand which was cut once to ten times per hour owing to gel grains was determined to be "good", and a strand which was cut eleven times or more per hour was determined to be "not good".

[Durability at Low Temperature]

The prepared pellet-like thermoplastic elastomer composition was formed, by using a 40 mm φ single-screw extruder with T-die of 200 mm width (PLAGIKEN CO., LTD) under an extrusion condition of a extrusion temperature of C1/C2/C3/C4/die=220/225/230/235/235° C., a cooling roll temperature of 50° C., and a take-over speed of 1.0 m/minutes, into a sheet having an average thickness of 1.0 mm, from which a dumbbell (JIS No. 3) was punched out to be put into a fatigue tester, and subjected to a fixed strain of 40% repeatedly applied under −40° C. atmosphere to measure the number of cycles to fracture. The number of cycles to fracture of less than 80 was evaluated to be "fail", that of 80 or more and less than 90 to be "pass", that of 90 or more and less than 110 to be "good", and that of 110 or more to be "excellent", on the basis of the number of cycles to fracture of the thermoplastic elastomer composition of Comparative example 1 which was set to be 100.

Tables 1 and 2 indicate evaluation results of the thermoplastic elastomer compositions.

TABLE 1

| name of components | Comparative example 1 | Comparative example 2 | Comparative example 3 | Comparative example 4 | Example 1 | Example 2 | Example 3 | Example 4 | Example 5 |
|---|---|---|---|---|---|---|---|---|---|
| (a) Br-IPMS (parts by mass) | | 20 | 30 | 30 | 25 | 35 | 30 | 20 | 25 |
| (b) modified rubber having an acid anhydride group 1 (parts by mass) | 100 | 80 | 70 | 70 | 75 | 65 | 70 | 80 | 75 |
| modified rubber having an acid anhydride group 2 (parts by mass) | | | | | | | | | |
| modified rubber having an acid anhydride group 3 (parts by mass) | | | | | | | | | |

TABLE 1-continued

| name of components | Comparative example 1 | Comparative example 2 | Comparative example 3 | Comparative example 4 | Example 1 | Example 2 | Example 3 | Example 4 | Example 5 |
|---|---|---|---|---|---|---|---|---|---|
| (c) EVOH 1 (parts by mass) | 70 | 70 | 70 | 70 | 70 | | | | |
| EVOH 2 (parts by mass) | | | | | | 60 | | | |
| EVOH 3 (parts by mass) | | | | | | | 60 | | |
| EVOH 4 (parts by mass) | | | | | | | | 60 | |
| EVOH 5 (parts by mass) | | | | | | | | | 60 |
| EVOH 6 (parts by mass) | | | | | | | | | |
| (d) processing aid 1 (parts by mass) | | | | 2 | | | | | |
| processing aid 2 (parts by mass) | | | | | | | 1 | 5 | |
| processing aid 3 (parts by mass) | | | 0.05 | | 1.5 | 6 | 2 | | |
| processing aid 4 (parts by mass) | | | | | | | | | 5 |
| (e) crosslinker 1 (parts by mass) | | 1 | 1 | 1 | 2 | 1 | 1 | 1 | 1 |
| crosslinker 2 (parts by mass) | | 1 | 1 | 1 | 2 | 1 | 1 | 1 | 1 |
| crosslinker 3 (parts by mass) | 2 | 2 | 2 | 2 | 2 | 2 | 2 | 2 | 2 |
| (f) polyamide resin 1 (parts by mass) | | | | | | | | | |
| polyamide resin 2 (parts by mass) | | | | | | | | | |
| polyamide resin 3 (parts by mass) | | | | | | | | | |
| total amount of (a) to (f) (parts by mass) | 172.0 | 174.0 | 174.1 | 176.0 | 177.5 | 170.0 | 167.0 | 169.0 | 169.0 |
| $W_a$ [wt %] | 0.0 | 20.0 | 30.0 | 30.0 | 25.0 | 35.0 | 30.0 | 20.0 | 25.0 |
| $W_b$ [wt %] | 100.0 | 80.0 | 70.0 | 70.0 | 75.0 | 65.0 | 70.0 | 80.0 | 75.0 |
| $W_d$ (parts by mass) | 0.0 | 0.0 | 0.2 | 6.7 | 6.0 | 17.1 | 10.0 | 25.0 | 20.0 |
| twin-screw kneadability | not good | not good | not good | not good | good | excellent | good | good | good |
| durability at low temperature | | | | | good | pass | good | good | good |

TABLE 2

| name of components | Example 6 | Example 7 | Example 8 | Example 9 | Comparative example 5 | Comparative example 6 | Example 10 | Example 11 |
|---|---|---|---|---|---|---|---|---|
| (a) Br-IPMS (parts by mass) | 30 | 30 | 30 | 15 | 70 | 45 | 25 | 20 |
| (b) modified rubber having an acid anhydride group 1 (parts by mass) | 70 | 70 | 70 | 85 | 30 | 55 | | |
| modified rubber having an acid anhydride group 2 (parts by mass) | | | | | | | 75 | |
| modified rubber having an acid anhydride group 3 (parts by mass) | | | | | | | | 80 |
| (c) EVOH 1 (parts by mass) | | | | | | | | |
| EVOH 2 (parts by mass) | | | | 50 | | | | |
| EVOH 3 (parts by mass) | | | | | | | | 70 |
| EVOH 4 (parts by mass) | | | 40 | | | | 60 | |
| EVOH 5 (parts by mass) | | | | | | | | |
| EVOH 6 (parts by mass) | 50 | 45 | | | 60 | 60 | | |
| (d) processing aid 1 (parts by mass) | | | | | | | | |
| processing aid 2 (parts by mass) | | | | | | | | |
| processing aid 3 (parts by mass) | 2 | 1 | 4 | 3 | 2 | 15 | 1.5 | 3 |
| processing aid 4 (parts by mass) | | | | | | | | |
| (e) crosslinker 1 (parts by mass) | 1 | 1 | 1 | 1 | 1 | 1 | 1 | 1 |
| crosslinker 2 (parts by mass) | 1 | 1 | 1 | 1 | 1 | 1 | 1 | 1 |
| crosslinker 3 (parts by mass) | 2 | 2 | 2 | 2 | 1 | 1 | 2 | 2 |
| (f) polyamide resin 1 (parts by mass) | | 15 | | | | | | |
| polyamide resin 2 (parts by mass) | | | | 20 | | | | |
| polyamide resin 3 (parts by mass) | | | | 10 | | | | |
| total amount of (a) to (f) (parts by mass) | 156.0 | 165.0 | 168.0 | 167.0 | 165.0 | 178.0 | 165.5 | 177.0 |
| $W_a$ [wt %] | 30.0 | 30.0 | 30.0 | 15.0 | 70.0 | 45.0 | 25.0 | 20.0 |
| $W_b$ [wt %] | 70.0 | 70.0 | 70.0 | 85.0 | 30.0 | 55.0 | 0.0 | 80.0 |
| $W_d$ (parts by mass) | 6.7 | 3.3 | 13.3 | 20.0 | 2.9 | 33.3 | 6.0 | 15.0 |
| twin-screw kneadability | good | good | good | good | excellent | excellent | good | good |
| durability at low temperature | excellent | good | good | good | fail | fail | good | good |

In Comparative example 1, with no halogenated isoolefin-para-alkylstyrene copolymer (a), the modified rubber (b) having an acid anhydride group was heavily loaded to produce the thermoplastic elastomer composition. Increase in viscosity of the thermoplastic elastomer composition inhibited to provide enough twin-screw kneadability.

In Comparative example 2, with no processing aid (d), the halogenated isoolefin-para-alkylstyrene copolymer (a) and the modified rubber (b) having an acid anhydride group were heavily loaded to produce the thermoplastic elastomer composition product. This case also failed to provide good twin-screw kneadability.

In Comparative example 3, the content ($W_d$) of the processing aid (d) was set to be less than 0.3 parts by mass with respect to 100 parts by mass of the halogenated isoolefin-para-alkylstyrene copolymer (a), and the halogenated isoolefin-para-alkylstyrene copolymer (a) and the modified rubber (b) having an acid anhydride group were heavily loaded to produce the thermoplastic elastomer composition. This case also failed to provide good twin-screw kneadability.

In Comparative example 4, zinc stearate which was not an alkaline earth metal salt was used as a processing aid (d), and the halogenated isoolefin-para-alkylstyrene copolymer (a) and the modified rubber (b) having an acid anhydride group were heavily loaded to produce thermoplastic elastomer composition. This case also failed to provide good twin-screw kneadability.

In Comparative example 5, the weight ratio ($W_a$) of the halogenated isoolefin-para-alkylstyrene copolymer (a) in the elastomer component ((a)+(b)) was set to be more than 60 wt %, to produce the thermoplastic elastomer composition. Although this case provided excellent twin-screw kneadability, it worsened durability at low temperature.

In Comparative example 6, the content ($W_d$) of the processing aid (d) was set to be more than 30 parts by mass with respect to 100 parts by mass of the halogenated isoolefin-para-alkylstyrene copolymer (a), to produce the thermoplastic elastomer composition. Although this case provided excellent twin-screw kneadability, it worsened durability at low temperature.

In Examples 1 to 11, the thermoplastic elastomer composition was produced according to the components to be blended and blending amounts of the present invention. All of these Examples exhibited good twin-screw kneadability and excellent durability at low temperature.

INDUSTRIAL AVAILABILITY

The thermoplastic elastomer composition of the present invention can be suitably used for production of a layer for preventing air-permeation (for example inner liner) of tires, particularly of pneumatic tires.

The invention claimed is:

1. A thermoplastic elastomer composition comprising
a polymer component comprising
  (a) a halogenated isoolefin-para-alkylstyrene copolymer;
  (b) a modified rubber having an acid anhydride group; and
  (c) an ethylene-vinyl alcohol copolymer,
and
  (d) a processing aid composed of an alkaline earth metal salt of higher fatty acid; and
  (e) a crosslinker,
wherein a weight ratio ($W_a$) of the halogenated isoolefin-para-alkylstyrene copolymer (a) to elastomer components (a)+(b) is 10 to 45 wt
wherein a weight ratio ($W_b$) of the modified rubber (b) having an acid anhydride group to elastomer components (a)+(b) is 90 to 55 wt %,
wherein a content ($W_d$) of the processing aid (d) composed of an alkaline earth metal salt of higher fatty acid is 0.3 to 30 parts by mass with respect to 100 parts by mass of the halogenated isoolefin-para-alkylstyrene copolymer (a).

2. The thermoplastic elastomer composition according to claim 1, further comprising (f) a polyamide resin as a polymer component, wherein a weight ratio of the polyamide resin (f) to thermoplastic resin components (c)+(f) is 5 to 50 wt %.

3. The thermoplastic elastomer composition according to claim 1, wherein a weight ratio of elastomer components (a)+(b) to the polymer component is 40 wt % or more.

4. The thermoplastic elastomer composition according to claim 1, wherein the processing aid (d) is an alkaline earth metal salt of a C5-30 fatty acid.

5. The thermoplastic elastomer composition according claim 1, wherein a saponification degree of the ethylene-vinyl alcohol copolymer (c) is 90% or more.

6. A film composed of the thermoplastic elastomer composition according to claim 1.

7. A tire using the film according to claim 6.

8. The thermoplastic elastomer composition according to claim 2, wherein a weight ratio of elastomer components (a)+(b) to the polymer component is 40 wt % or more.

9. The thermoplastic elastomer composition according to claim 8, wherein the processing aid (d) is an alkaline earth metal salt of a C5-30 fatty acid.

10. The thermoplastic elastomer composition according to claim 2, wherein the processing aid (d) is an alkaline earth metal salt of a C5-30 fatty acid.

11. The thermoplastic elastomer composition according to claim 3, wherein the processing aid (d) is an alkaline earth metal salt of a C5-30 fatty acid.

12. The thermoplastic elastomer composition according to claim 11, wherein a saponification degree of the ethylene-vinyl alcohol copolymer (c) is 90% or more.

13. The thermoplastic elastomer composition according to claim 2, wherein a saponification degree of the ethylene-vinyl alcohol copolymer (c) is 90% or more.

14. The thermoplastic elastomer composition according to claim 3, wherein a saponification degree of the ethylene-vinyl alcohol copolymer (c) is 90% or more.

15. The thermoplastic elastomer composition according to claim 4, wherein a saponification degree of the ethylene-vinyl alcohol copolymer (c) is 90% or more.

16. The thermoplastic elastomer composition according to claim 8, wherein a saponification degree of the ethylene-vinyl alcohol copolymer (c) is 90% or more.

17. The thermoplastic elastomer composition according to claim 9, wherein a saponification degree of the ethylene-vinyl alcohol copolymer (c) is 90% or more.

18. The thermoplastic elastomer composition according to claim 10, wherein a saponification degree of the ethylene-vinyl alcohol copolymer (c) is 90% or more.

19. A film composed of the thermoplastic elastomer composition according to claim 2.

20. A film composed of the thermoplastic elastomer composition according to claim 3.

* * * * *